United States Patent
Klingen (10) Patent No.: US 9,299,071 B1
(45) Date of Patent: Mar. 29, 2016

(54) SYSTEM AND METHOD FOR PROCESSING A BEACON BASED PURCHASE TRANSACTION

(71) Applicant: Apriva, LLC, Scottsdale, AZ (US)

(72) Inventor: Michael S. Klingen, Paradise Valley, AZ (US)

(73) Assignee: Apriva, LLC, Scottsdale, AZ (US)

( * ) Notice: Subject to any disclaimer, the term of this patent is extended or adjusted under 35 U.S.C. 154(b) by 0 days.

(21) Appl. No.: 14/497,807

(22) Filed: Sep. 26, 2014

(51) Int. Cl.
*G06Q 20/00* (2012.01)
*G06Q 20/32* (2012.01)

(52) U.S. Cl.
CPC .................................. *G06Q 20/322* (2013.01)

(58) Field of Classification Search
USPC .............................. 235/380; 705/21, 26.1, 44
See application file for complete search history.

(56) References Cited

U.S. PATENT DOCUMENTS

| | | | | |
|---|---|---|---|---|
| 2009/0248538 A1* | 10/2009 | Taylor | ................... | G06Q 20/02 705/26.1 |
| 2012/0286928 A1* | 11/2012 | Mullen | .................. | G06Q 10/00 340/5.61 |
| 2014/0195363 A1* | 7/2014 | Van | ........................ | G06Q 20/20 705/21 |
| 2015/0032623 A1* | 1/2015 | Friedman | ............. | G06Q 20/401 705/44 |
| 2015/0066769 A1* | 3/2015 | Tallal, Jr. | ............... | G06Q 20/42 705/44 |

* cited by examiner

*Primary Examiner* — Daniel Hess
(74) *Attorney, Agent, or Firm* — Law Offices of David O. Caplan, PLLC (57) ABSTRACT

In a purchase transaction between a merchant and a customer, a merchant device sends transaction information to a payment gateway and sends a beacon signal containing a transaction identifier to a customer mobile device. The customer mobile device sends the transaction identifier and payment information corresponding to a customer payment account to the payment gateway. The payment gateway applies the transaction identifier to access the transaction information received from the merchant device and sends purchase information based on the transaction information to the customer mobile device. The customer mobile device displays the purchase information to the customer, obtains an indication of customer assent to pay for the item and sends a confirmation of customer assent to the payment gateway. Upon receiving the confirmation of customer assent from the customer mobile device, the payment gateway processes the purchase transaction based on the payment account information.

20 Claims, 3 Drawing Sheets

SYSTEM AND METHOD FOR PROCESSING A BEACON BASED PURCHASE TRANSACTION

FIELD OF THE INVENTION

The present invention relates generally to electronic payment transactions and, more particularly, to the utilization of mobile devices to perform and facilitate such transactions.

BACKGROUND

As mobile devices such as Smartphones become commonplace, they are increasingly equipped with technologies that allow them to perform a wide variety of functions. Such functions include purchase transactions in which customers utilize their mobile devices to facilitate payment for items at the point of sale. One approach utilizes Smartphones equipped with Near Field Communication (NFC) to enable customers to pay merchants without requiring the presentation of a conventional physical payment card such as a credit card. Having previously provided credit card information to his Smartphone, the customer pays the merchant by tapping or waving the phone closely over an NFC reader provided by the merchant.

The NFC approach described above has limitations, however. For one thing, the NFC reader is only able to obtain information from the phone if it is positioned in very close proximity, that is, within a few centimeters of the reader. As such, payment by NFC typically requires the customer to consciously perform a physical action to bring the phone sufficiently close to the reader, such as by tapping or waving the phone as described above.

Furthermore, although the NFC approach allows the customer to provide information to the merchant via the reader, no means are typically available for the merchant to provide information directly to the customer phone. As such, the customer has no way to ensure that his information will be associated with the present transaction unless he presents his credit card to the merchant or taps or waves a phone over the reader, as described above. Thus, there is a need for a mobile device based purchase approach that overcomes these limitations.

SUMMARY OF THE INVENTION

The present invention provides, among other advantages that will be apparent to one of ordinary skill in the art from the description herein, a means of utilizing a customer's mobile device to perform a purchase transaction without requiring the customer to present a conventional credit card or to tap or wave the mobile device over a reader. Additionally, the present invention improves the effectiveness and efficiency of the transaction and/or simplifies the participation of the customer and the merchant by providing a means for immediate and direct communication of relevant data from the merchant to the customer. This allows, for example, the merchant to provide to the customer a means to uniquely identify the transaction to a payment gateway which can then process the payment.

The present invention may include, but is not necessarily limited to, the features and functions discussed in the following general description. When a customer approaches a merchant with one or more items for purchase, a merchant device obtains item information associated with the items. The merchant device also obtains a beacon payment selection indicating that a beacon is to be utilized in performing the transaction. Correspondingly, a merchant beacon transmits a beacon signal which contains a transaction identifier uniquely associated with the transaction. The merchant device also sends, over a network to a payment gateway, transaction information based on the item information and a beacon payment indicator based on the beacon payment selection.

Upon receiving the beacon signal containing the transaction identifier, the customer device sends, over a customer network to the payment gateway, the transaction identifier and payment account information corresponding to a payment account of the customer. The payment gateway uses the transaction identifier to identify the present transaction and access the transaction information that was provided by the merchant device, and then sends purchase information based on the transaction information to the customer device. The customer device displays the purchase information to the customer and obtains from the customer an indication of assent to pay for the items.

Upon obtaining the indication of assent from the customer to pay for the items, the customer device sends to the payment gateway a confirmation of assent based on the indication obtained. Upon obtaining the confirmation, the payment gateway processes the purchase transaction based on the payment account information and returns a transaction result to the merchant device and the customer device.

By providing, from the merchant device, a beacon signal which a customer device can receive and use to uniquely identify the transaction to the payment gateway, the present invention makes it possible for the customer to pay for a purchase without having to perform a physical action to present the device to a merchant reader. As a result, the present invention provides numerous advantages over reader-based transactions such as NFC, and overcomes numerous disadvantages that would result from such reader-based transactions.

Compared to a reader-based approach, the present invention simplifies the purchase process and reduces the time required to make a purchase. For one thing, the invention eliminates the delay that results from having to present the device to a reader. The invention may also eliminate other delays associated with the process of presenting the device to the reader, such as customer uncertainty about when to present the device. Even in circumstances that would otherwise be ideal for a reader-based transaction, the invention reduces the time required to make a purchase to an extent that, when multiplied by numerous customers, can have a significant impact on logistics and efficiency.

The present invention overcomes even more significant disadvantages of a reader-based transaction in circumstances where the customer would face any difficulty in presenting his device to the reader. Such difficulty may occur, for example, when the customer is not located within easy reach of the reader, is physically obstructed from the reader, or has disabilities that make it difficult or impossible to present the device to the reader. In such cases, a reader-based approach may significantly delay the purchase process, render it unpleasant to the customer as well as the merchant and other customers, entirely prevent the customer from using his device to make a purchase or, in circumstances where alternative means are not available, even prevent the customer from making a purchase altogether.

Furthermore, when compared to a reader-based transaction, the present invention significantly reduces the risk of a customer acquiring illnesses and other afflictions as a result of having to place his or her hands on or in close proximity to a reader that numerous other customers have placed their hands on or in close proximity to. The invention may also reduce the risk of illnesses being acquired by customers as a result of potentially having to come in closer proximity to a merchant employee in the process of presenting the device to the reader.

Additionally, when compared to a reader-based approach, the present invention reduces the risk of damage to the customer device (such as from dropping the device) that may occur in the process of presenting it to the reader. Such a risk can be substantial when the customer is not positioned ideally with respect to the reader so as to require awkward action such as reaching over a counter, across a cart, through a drive-through window and so forth. The invention may also reduce the risk of damage to clothing or soiling of clothing or skin as a result of touching the reader or associated equipment or reaching across the counter or other objects in order to present the device to the reader. Even under more fortunate circumstances, the present invention still reduces wear and tear on the customer device by eliminating the need to present it to a reader.

Still additional advantages may be realized in embodiments and/or circumstances where a purchase would not otherwise require the customer to directly contact the device. For example, while a customer's assent to pay or selection of a payment instrument might be accomplished by holding the device to read a display and/or provide input to a touchscreen, this information might instead be obtained another way, such as by a vocal communication by the customer to the customer phone or by a default presumption by the customer device under predefined circumstances. In such a case, the invention provides the customer with the ability to pay for the purchase without having to even retrieve the device from his or her pocket, belt clip, purse, backpack, or other location on or near the person of the customer. In addition to saving the time required to retrieve the device, this provides advantages such as allowing the customer to keep a hand free for other purposes, avoiding additional risk to the device, reducing wear and tear, and avoiding exposure to potentially harmful conditions such as rain, dust, debris and so forth.

Yet additional advantages may be realized in a mobile merchant environment. For example, a merchant who provides services or functions that can be performed externally to all or part of a customer home or office can obtain payment for such services without having to enter the home or office. Such services or functions may include deliveries, exterior repairs, landscaping, gardening, pool service, door to door sales, bill collection, charity solicitations, fundraising and so forth. This provides safety and peace of mind to the customer, who may remain behind the safety of locked doors. It also provides safety and peace of mind to the merchant, who may remain within the relative safety of more public view, as well as the business advantages associated with providing safety and peace of mind to customers.

BRIEF DESCRIPTION OF EXEMPLARY DRAWINGS

A more complete understanding of the present invention may be derived by referring to the detailed description and claims when considered in connection with the Figures, wherein like reference numbers refer to similar elements throughout the Figures.

It should be appreciated by one of ordinary skill in the art that, while the present invention is described with reference to the figures described above, the invention may include a variety of embodiments consistent with the description herein. It should also be understood that, where consistent with the description, there may be additional components not shown in the system diagrams or additional steps not shown in the flowcharts, and that such components and steps may be arranged or ordered in different ways.

DETAILED DESCRIPTION OF EXEMPLARY EMBODIMENTS

A purchase transaction system is described below which facilitates a purchase transaction between a merchant and a customer. As used herein and where appropriate in the context of the description, the term "merchant" may refer to a business, a particular store location or mobile unit of such a business, a specific employee or agent of such a business, and so forth. Similarly, as used herein and appropriate to the context of the description, the term "customer" may refer to an individual who possesses, interacts with and/or owns the customer device, an individual who communicates with the merchant and/or takes possession of the item or items, or an individual, group or entity who maintains a payment account from which funds are drawn to pay for the purchase. The terms "merchant" and "customer" may also apply to private parties engaged in private transactions such as a person-to-person transaction in which one individual is a merchant who provides an item or items to another individual who is the customer and who might pay, for example, with a virtual currency such as Bitcoin.

Also as used herein, a "purchase", "purchase transaction" or "transaction" may refer to, as appropriate, any financial transaction in which one party provides payment to another party, including a sale, lease, charitable contribution, tip, reimbursement, loan, repayment, settlement, judgment and so forth. In similar fashion, an "item" or "items" may refer to anything for which payment is provided, such as one or more products, services, donations, gratuities, rights, interests and so forth. The appropriate interpretation(s) of the terms "purchase", "purchase transaction", "merchant", "customer", "item", "items" and other terms used herein will be comprehended by one of ordinary skill in the art in the context of their use in the description herein, and should be understood to potentially include all potential interpretations reasonably within the scope of the invention.

The purchase transaction system described herein employs "beacon" technology to advantageously facilitate a purchase transaction between a merchant and a customer using a mobile device equipped with such technology. As used herein, beacon technology refers to Bluetooth low energy (also known as Bluetooth LE, BLE, or Bluetooth Smart) technology, or technology based thereon. The term "beacon" as used herein may refer generally to beacon technology or may refer specifically to a device which uses beacon technology, such as a beacon transceiver that transmits a beacon signal to, and/or receives a beacon signal from, other devices that use beacon technology. An example of beacon technology is iBeacon™, provided by or associated with Apple, Inc. A beacon that uses iBeacon technology may be provided by Apple or by another company to be generally compatible with iBeacon technology, and may in some instances be referred to as an iBeacon. An example of an iBeacon-compatible beacon is the Estimote Beacon, which is provided by Estimote, Inc. and certified by Apple.

Figure 1:
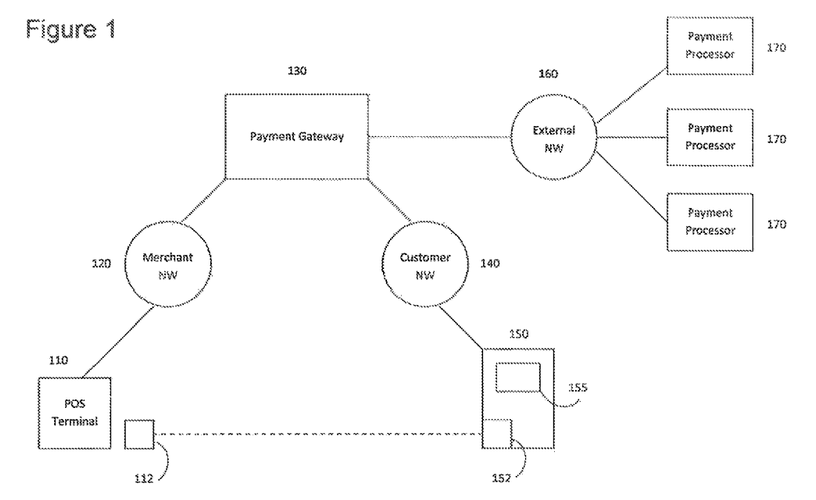
FIG. 1 is a system diagram showing the main components of a version of a purchase transaction system in which the merchant employs a point of sale terminal in accordance with one embodiment of the invention.

FIG. 1 shows an embodiment of a purchase transaction system in which the merchant utilizes an essentially stationary point of sale terminal. As shown, a point of sale (POS) terminal 110 utilizes a static merchant beacon transceiver 112 to transmit beacon signals to beacon equipped devices within a specified range. The POS terminal 110 is, for example, a conventional stationary POS terminal, additionally configured as appropriate to perform the functions described herein to facilitate a beacon-based transaction. The POS terminal 110 is essentially stationary in that it remains generally in a same position during most of the time it is operational, such as a POS terminal maintained at a location designated for checkout.

The static merchant beacon transceiver 112 is a beacon transceiver as described above, provided to operate in conjunction with the POS terminal 110. The static merchant beacon transceiver 112 is "static" in the sense that it is fixed in a generally stationary position corresponding to the position of the POS terminal 110. The static merchant beacon transceiver may be provided as part of the POS terminal 110, attached or affixed to the POS terminal 110, or separate from but proximate to the POS terminal 110, such as within 1 meter or closer. The static merchant beacon transceiver 112 could also be maintained on the person of a merchant who is located very close to the POS terminal 110 during a relevant portion of the purchase transaction or attached to or a component of a related device.

The POS terminal 110 communicates via a merchant network 120 with a payment gateway 130. The merchant network 120 is, for example, a conventional point of sale network established to connect one or more point of sale terminals over the internet to a server such as a payment gateway, and may include any local networks as necessary to perform functions appropriate for the purpose of conveying information between the POS terminal 110 and payment gateway 130. The payment gateway 130 contains means for handling payment transactions, wallet application server functions and so forth in an essentially conventional manner, but is additionally configured as appropriate to perform the functions described herein that facilitate beacon-based transactions.

The payment gateway 130 is also accessible via a customer network 140 by a customer mobile device 150 maintained by the customer. The customer network 140 includes, for example, an internet connection between the customer mobile device 150 and the payment gateway 130, as may be facilitated by a cellular network and/or other means, and may include any local networks as necessary to perform functions appropriate for the purpose of conveying information between the customer mobile device 150 and the payment gateway 130.

The customer mobile device 150 includes a customer beacon transceiver 152 and a wallet application 155. The customer mobile device 150 is, for example, a mobile communication device such as a Smartphone, a tablet computer or other mobile computing device capable of being equipped with a beacon transceiver and a wallet application as described herein. One example of such a customer mobile device 150 would be an Apple iPhone running a version of the Apple iOS operating system and equipped with iBeacon. The customer mobile device 150 could also be a Google Android operating system based phone provided by any of a number of different makers such as Samsung, HTC, LG and Motorola and equipped with a beacon as described above.

The wallet application 155 is a software application at least partly resident on and executable by the customer mobile device 150 which allows the customer to initiate and complete payments using previously stored or newly entered payment account information, and may contain additional capabilities such as the provision and management of receipts, coupons, discount offers, loyalty credits, and so forth. The wallet application 155 is, for example, a conventional wallet application that is additionally configured to facilitate beacon-based transactions as described herein.

The payment gateway 130 communicates via an external network 160 to any number of payment processors 170. Each payment processor 170 corresponds to an institution, or a component thereof, in which the customer may hold an account that can be accessed to make payments, and/or an institution in which the merchant may hold an account which is used to collect such payments. As used herein, a payment processor 170 may refer to a conventional credit card payment processor or payment network, a digital currency payment processor or any other entity appropriate for processing payments as described herein.

Figure 2:
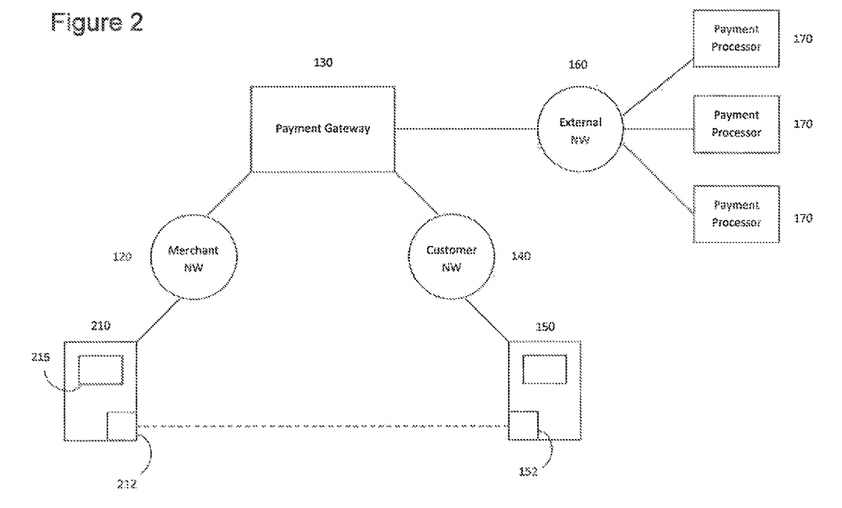
FIG. 2 is a system diagram showing the main components of a version of a purchase transaction system in which the merchant employs a mobile communication device having a point of sale application in accordance with another embodiment of the invention.

FIG. 2 shows an embodiment of a purchase transaction system in which the merchant employs a mobile device, rather than a stationary point of sale terminal as shown in FIG. 1, to perform point of sale functions. This allows the merchant to perform point of sale transactions in a mobile environment. For example, the merchant may be a service technician who travels to customer locations to provide services and obtain payment at such locations. As another example, purchase transactions could be performed by a retail sales associate who is enabled to move about within the confines of a merchant store or location.

As shown in FIG. 2, a merchant mobile device 210 includes a mobile merchant beacon transceiver 212 and a POS application 215. The merchant mobile device 210 is, for example, a mobile communication device such as a Smartphone, a tablet computer or other mobile computing device capable of being equipped with a beacon transceiver and a POS application as described herein. For example, merchant mobile device 210 could be an iBeacon-equipped iOS-based iPhone or could be a beacon-equipped Android-based phone provided by Samsung, HTC, LG or Motorola. Alternatively, where not equipped with a built-in beacon, the merchant mobile device 210 could be configured to operate with a mobile merchant beacon transceiver 212 that is affixed to the merchant mobile device 210, or otherwise maintained in close proximity to the merchant mobile device even when both are in motion.

The POS application 215 allows the merchant mobile device 210 to perform functions similar to the POS terminal 110, but in a mobile environment as described above, so as to potentially provide point of sale transactions in whatever location the merchant is in at the time of the transaction. The POS application 215 is, for example, a conventional POS software application which allows a mobile device to perform functions similar to a POS terminal, additionally configured to facilitate beacon-based transactions as described herein and least partially resident on and executable by the merchant mobile device 210.

In an alternative embodiment where the merchant mobile device 210 is maintained in very close proximity to a POS terminal, the merchant mobile device 210 could be configured so as provide the beacon component of the beacon-based transaction while still utilizing the POS terminal to provide the POS functions. In such an embodiment, the mobile merchant beacon transceiver 212 would essentially perform the functions described above with reference to the static merchant beacon transceiver 112.

Other aspects of the financial transaction system are essentially the same as described above with reference to FIG. 1 and, as such, the other components are shown with the same reference numerals. It will be understood, however, that such components may operate differently at least as necessary to operate in conjunction with a mobile merchant device. For example, the merchant network 120 will, in such case, be appropriately configured to interact with a mobile device.

Figure 3:
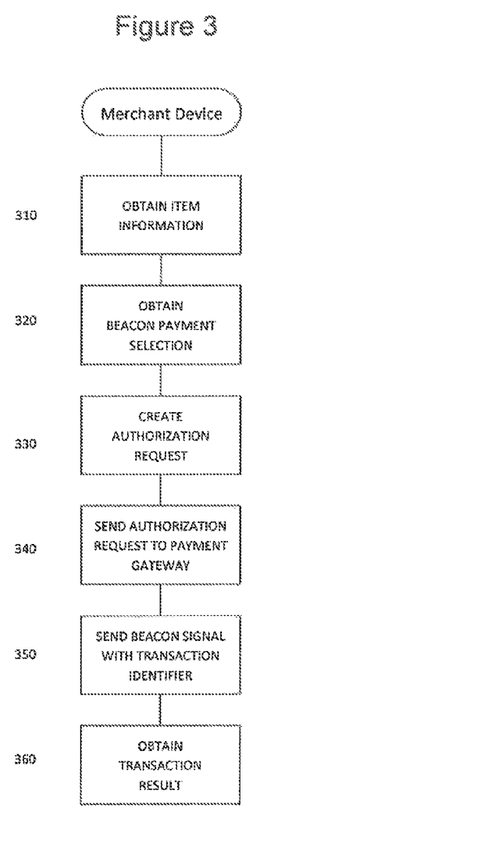
FIG. 3 is a flowchart showing the main steps performed by the merchant device in accordance with an embodiment of the invention.
Figure 4:
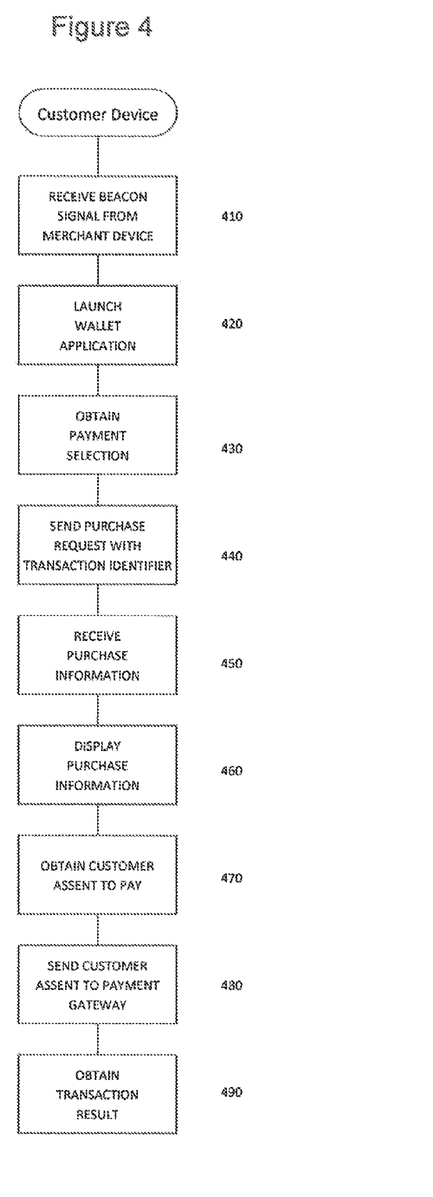
FIG. 4 is a flowchart showing the main steps performed by the customer mobile device in accordance with an embodiment of the invention.
Figure 5:
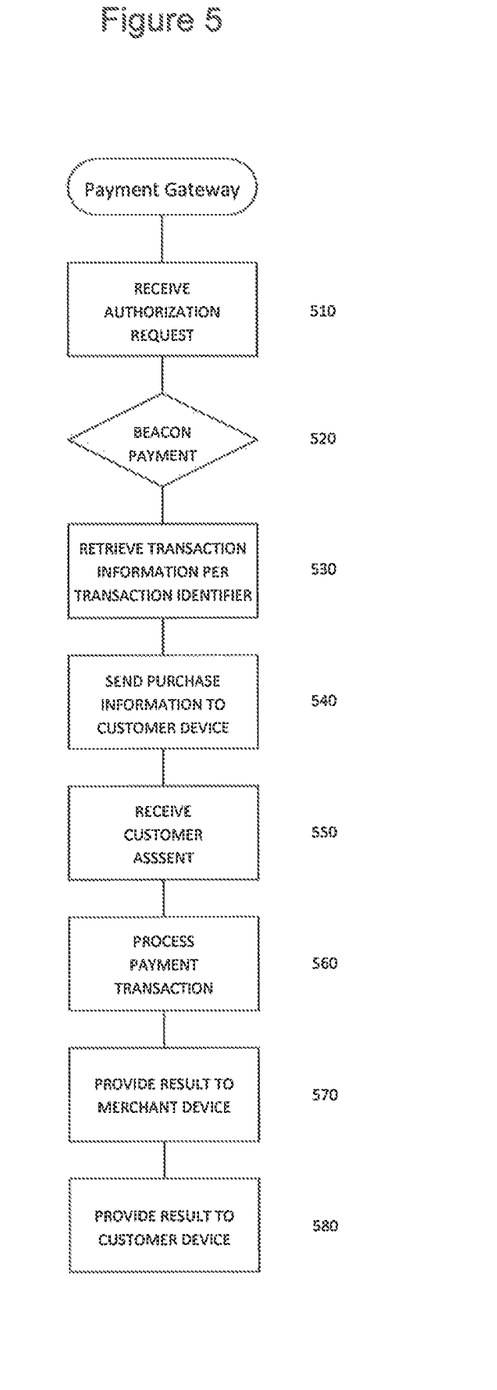
FIG. 5 is a flowchart showing the main steps performed by a payment gateway in accordance with an embodiment of the invention.

FIGS. 3 through 5 are flowcharts of the steps performed by the purchase transaction system overall, separated by the portion of the system (merchant device, customer device, payment gateway) that performs them. One of ordinary skill in the art will readily appreciate that, where appropriate and consistent with the general description herein, steps may be performed in a different order than shown and described.

FIG. 3 is a flowchart showing the main steps performed by a merchant device in accordance with an embodiment of the invention. The merchant device is, for example, the combination of POS terminal 110 and static merchant beacon transceiver 112 or is, for example, the merchant mobile device 210.

In step 310, the merchant device obtains item information relating to one or more items identified to be purchased by the customer. This may be initiated upon the merchant scanning item identifying information via a barcode scanner such as a Universal Product Code (UPC) scanner connected to the merchant device, via a Quick Response (QR) code reader, or other means. Alternatively, the merchant may enter the item information into the merchant device manually, or may simply enter a price. The merchant device may be equipped with any number of security measures controlling user access to and interaction with the device, including password, personal identification number (PIN) or various biometric applications.

In step 320, the merchant device obtains from the merchant a beacon payment selection designating that a merchant beacon (such as static merchant beacon transceiver 112 or mobile merchant beacon transceiver 212) will be utilized in performing the transaction and sends to the payment gateway a beacon payment indicator based on the beacon payment selection. As will be explained in more detail below, this effectuates an indication to the purchase transaction system that the present transaction will be a beacon based transaction. The beacon payment selection may be, for example, a selection by the merchant among options provided via a user interface of the POS terminal 110 or of the merchant mobile device 210. Alternatively, the beacon payment selection may be generated automatically upon receiving an acknowledgement from the customer device that a beacon signal sent by the merchant device (as is described below with reference to step 350) has been received by the customer device.

In other possible embodiments, the merchant device may be configured and/or employed to allow the customer rather than the merchant to perform some or all the functions associated with identifying the item or items to the purchase transaction system and/or indicating to the purchase transaction system that the present transaction may be a beacon-based transaction. In such a system, the merchant may, for example, provide the customer with access to the merchant device, such as by handing the merchant mobile device 210 to the customer.

In a different embodiment, the functions of the merchant device could be performed by a shopping device such as a beacon-equipped personal computer, laptop, tablet computer or the like which provides means for performing online purchases over the internet in an essentially conventional way but is further configured to send, to the customer device, a beacon signal that contains a transaction identifier as described above. The shopping device may be a customer shopping device operated by the customer who pays for the transaction, or alternatively the shopping device may be a third party shopping device operated by a shopper other than the customer who pays for the transaction. The shopper may be, for example, a spouse, friend or relative of the customer. Further still, the shopping device may be a mobile device such as a beacon-equipped Smartphone, thus allowing for the customer to pay for online purchases of the shopper regardless of location as long as the shopper and the customer are close enough that the customer device is in range of the shopping device.

In another embodiment, the merchant device could be a self-checkout device having a means into which a customer can scan his items for purchase as well as a user interface into which the customer may enter information relevant to the purchase. POS terminal 110 could be, for example, all or a portion of a conventional self-checkout system, configured as appropriate to perform the functions described herein. The user interface could also be configured to allow the customer to make a beacon payment selection indicating to the purchase transaction system that the transaction will be a beacon-based transaction.

In yet another embodiment, the merchant device could be a vending machine that automatically vends items without typically requiring the immediate presence of a merchant attendant or employee. The POS terminal 110 could be, for example, implemented as a conventional vending machine, additionally configured to perform the functions described herein. In addition to providing conventional means for product selection, such a vending machine could be configured to obtain a beacon payment selection from the customer indicating the vend will be a beacon-based transaction. Particularly as vending machines often involve quick purchases of low cost items, the invention may provide especially valuable advantages when combined with other functions that allow a customer to perform a purchase without directly accessing the device, such as the application of a rule that presumes the customer's assent to pay when a purchase amount is below an appropriate threshold, especially when weather makes it difficult to retrieve either a conventional wallet or a customer device such as a phone, when change is not readily available, and so forth.

In step 330, the merchant device utilizes the item information and the beacon payment selection provided to create an authorization request which includes transaction information and a beacon payment indicator. The transaction information includes, for example, purchase amount, terminal identification number (TID), merchant identification number (MID) and so forth. The beacon payment indicator is, for example, a flag that indicates that the merchant beacon is utilized in performing the transaction, which informs the payment gateway to expect information provided therein to be received by the customer device and further provided to the payment gateway. The transaction information and the beacon payment indicator may be entered, for example, into designated and/or newly determined fields of an authorization request type ISO 8583 message, such fields to be recognized by the payment gateway as holding the transaction information and beacon payment indicator.

In step 340, the merchant device sends the authorization request with the transaction information and the beacon payment indicator to the payment gateway. For example, the POS terminal 110 or the merchant mobile device 210 sends the authorization request over the merchant network 120 to the payment gateway 130.

In step 350, the merchant device sends a beacon signal containing a transaction identifier that uniquely identifies the present transaction. For example, the POS terminal 110 invokes the static merchant beacon transceiver 112 to send the beacon signal, or the merchant mobile device 210 invokes the mobile merchant beacon transceiver 212 to send the beacon signal. In various embodiments, the beacon signal could be enabled by action of the merchant, such as upon an indication (spoken or otherwise) from the customer to the merchant that a beacon may be used, or enabled automatically by the merchant device, such as upon the beacon payment selection by the merchant. Alternatively, the merchant device could be configured to send the beacon signal when item information begins to be obtained, such as upon the commencement of scanning of items.

In yet other embodiments or variations, the merchant device may send a beacon signal continuously and/or periodically which identifies the most current transaction, such that the customer device will receive the beacon signal immediately or soon after coming within range of the merchant beacon. In such case, the merchant device may not send the beacon payment indicator to the payment gateway as described above until receiving a beacon signal from the customer device containing an acknowledgement that the merchant beacon signal was received and/or other indication(s) that a beacon based transaction is acceptable.

As will be understood by one of ordinary skill in the art, a beacon is designed to send a concise collection of data in a format that will be recognized by the receiving device. An iBeacon compatible device, for example, has a 16 byte UUID field that contains a Universally Unique Identifier (UUID) value, a 2 byte Major field that holds a selectable major value, and a 2 byte Minor field that holds a selectable minor value. In such a configuration, the transaction identifier could be any value or set of values that is represented within one or a combination of these fields. The transaction identifier could be or could include, for example, a MID (in same or different format as above), a TID (in same or different format as above) where the merchant device is a POS terminal 110, an appropriate device identification number where the merchant device is a merchant mobile device 210, a purchase amount, virtual currency information, a Bitcoin invoice number, or any other information, or combination of such information, that is sufficient to uniquely identify the transaction.

The beacon signal described above and/or other beacon signals sent by the merchant device, may also include additional information as appropriate, such as other transaction information, location information, a code or other indication of eligibility for a discount applicable to the present purchase or a potential future purchase, or any other application specific data useful in performing the transaction. Information provided within any such beacon signal may be contained within a single beacon signal or may be spread over multiple beacon signals.

As performance of the transaction continues with actions performed by the payment gateway and the customer device, discussion will continue now with reference to FIGS. 4 and 5 before returning to FIG. 3. FIG. 4 is a flowchart showing the main steps performed by a customer device in accordance with an embodiment of the invention. The customer device is, for example, the customer mobile device 150.

In step 410, the customer device receives, from the merchant device, the beacon signal which contains the transaction identifier that uniquely identifies the present transaction. For example, the customer beacon transceiver 152 of the customer mobile device 150 receives the beacon signal from either the static merchant beacon transceiver 112 (where the merchant device is a POS terminal 110) or the mobile merchant beacon transceiver 212 (where the merchant device is a merchant mobile device 210.)

The merchant device may be configured such that the beacon transceiver will transmit a beacon signal to devices only within a reasonably close proximity range, such as one or two meters, so that the customer device will receive or acknowledge the signal due to the customer's proximity to the point of sale. The merchant device may also be configured such that the beacon transceiver will transmit the beacon signal at a limited signal strength level that is selected taking into account not only distance but also the impact on accuracy of potential obstructions to the signal. In this way the range may be selected by the merchant so as to best represent the actual layout and/or circumstances of the point of sale. In such cases, the distance and/or signal strength may be initially set to a default value that will be used unless changed by the merchant.

In addition to this, the customer device may be configured to only acknowledge beacon signals from within a certain proximity range, such as one or two meters, such that it will only receive or acknowledge beacon signals from a merchant device it is sufficiently close to at the time. The customer device may also be configured so as to recognize only beacon signals that surpass a designated level of signal strength that will take into account both distance and the impact on accuracy of potential obstructions to the signal. In this way the customer device may be more likely to recognize the merchant beacon when the customer is the most current customer of the merchant.

One of ordinary skill in the art will recognize that selection of proximity range and signal strength will depend on the circumstances at hand. In an embodiment where the POS terminal 110 is a vending machine as described above, a closer range such as 0.5 meters may be selected, as it can be presumed the customer is that close upon interaction with the machine such as by making an item selection by pressing a button on the vending machine or via a user interface resident on the vending machine, or by making a beacon payment selection (to indicate the vend will be a beacon-based transaction) in similar fashion.

In addition to configuring ranges as described above so that the merchant beacon signal will be received by the desired customer device, a number of measures may be taken as appropriate to ensure that the correct transaction is processed for the correct customer. The customer device may be configured, for example, to send to the payment gateway an indication of the time which the merchant beacon signal was first received from the customer device, such that the payment gateway will presume, if more than one customer device has sent a same transaction identifier, the customer device to have received the beacon signal first corresponds to the customer for the identified transaction. Alternatively or additionally, the payment gateway may obtain information from the customer device that indicates its proximity to the merchant device at one or more points in the transaction and compare this information to that which has been provided by other customer devices so as to determine the correct customer for a given transaction. One of ordinary skill in the art will recognize more sophisticated rules based on combinations of proximity, time, location, transaction status and so forth, as appropriate to the circumstances at hand.

In step 420, the customer device launches a wallet software application resident on the customer mobile device. The wallet application may be launched by operation of the customer or it may be launched automatically by the customer device in response to the merchant beacon. For example, the customer mobile device 150 invokes the wallet application 155 upon the customer beacon transceiver 152 receiving a beacon signal from the static merchant beacon transceiver 112 (where the merchant device is a POS terminal 110) or from the mobile merchant beacon transceiver 212 (where the merchant device is a merchant mobile device 210.) In conjunction with the wallet application or otherwise, the customer device may be equipped with any number of security measures controlling user access to and interaction with the device, including password, personal identification number (PIN) or various biometric applications.

In step 430, the customer device obtains a payment type selection from the customer via the wallet application. For example, the wallet application may display a list of available payment options, each corresponding to a payment account maintained by the customer. These could include one or more credit card accounts, debit card accounts, checking accounts, or any other means of accessing funds that can be transferred to the merchant in payment for the purchase, potentially including digital currency, virtual currency, cryptocurrency and so forth. Examples include Visa, American Express, PayPal, Bitcoin, and so forth. In an alternative implementation, the wallet application may be configured so as to automatically select a payment option based on a default option previously designated by the customer, based on a determination made by the wallet application depending on a potential variety of factors such as available balances, user history and so forth.

In step 440, the customer device sends a purchase request to the payment gateway. For example, the customer mobile device 150 sends the purchase request to the payment gateway 130 via the customer network 140. The purchase request includes payment information representing the payment account selected by the customer to pay for the purchase. The purchase request further includes the transaction identifier, received from the merchant device, which uniquely identifies the present transaction. It should be understood that the transaction identifier may be in a different form when provided by the customer device to the payment gateway than it was when sent by the merchant device to the customer device. The transaction identifier may be, for example, formatted or arranged differently and/or in a different form that is based on or derived from the form it was in when obtained from the merchant device, but such that it will still be ascertainable by the payment gateway to uniquely identify the present transaction. The transaction identifier may also be communicated to the payment gateway separately from the payment account information, such as separately from a purchase request that contains the account information, and thereafter be associated with the payment gateway in an appropriate fashion, such as being identified as part of a same communication or by cross reference or common reference.

In additional aspects of the invention, the customer device may send to the payment gateway additional information, whether provided together with the transaction identifier and/or together with or as part of the payment account information or separately and thereafter associated with such information by appropriate means. Such additional information may include a customer identifier that uniquely identifies the customer to the payment gateway, such as a customer wallet account number that corresponds to the customer's wallet account. The payment gateway may utilize the customer identifier to identify payment accounts of the customer and obtain corresponding payment account information stored by the payment gateway rather than the customer device, such that sensitive payment account information does not have to be transmitted by the customer device. Furthermore, such a customer identifier may be utilized by the payment gateway to determine whether the customer is entitled to any discounts as may be associated with membership in a loyalty program maintained by or otherwise associated with the merchant, and/or the customer's purchase history, behavioral history and so forth. In such case, the payment gateway may apply the discount to adjust the purchase amount before processing the payment, may communicate to the customer device that the discount was applied, and so forth.

FIG. 5 is a flowchart showing the main steps performed by the payment gateway in accordance with an embodiment of the invention. The payment gateway is, for example, the payment gateway 130 shown in FIGS. 1 and 2. It will be understood that the payment gateway may be protected by any number of security measures which prevent access to the system from outside parties including firewall protection and so forth, and which further control user access to and interaction with devices therein, including password, personal identification number (PIN) or various biometric applications.

In step 510, the payment gateway receives the authorization request provided by the merchant device in step 340. In step 520, the payment gateway determines whether the beacon payment indicator provided by the merchant device indicates that the merchant beacon is being utilized in performing the present purchase transaction. If not, the payment gateway handles the transaction by a different process (not shown) such as a conventional process for handling a transaction in which the customer's payment information would have been provided to the merchant, such as by presentation of a credit card or tapping of a phone to a reader, and then obtained by from the merchant device via the merchant network 120. If the payment gateway determines in step 520 that the beacon payment indicator indicates the merchant beacon is being utilized in performing the present purchase transaction, processing proceeds to steps 530 through 590 where the transaction will be handled accordingly.

In step 530, the payment gateway uses the transaction identifier obtained from the customer device to retrieve the transaction information supplied by the merchant device in the authorization request. It will be appreciated that this function may be performed in different ways depending on how the relevant information is represented, formatted, stored, accessed and retrieved in the implementation at hand. Where the transaction identifier includes a TID, for example, the payment gateway may access a predefined number of the most recent authorization requests, identify the most recently received authorization request containing the same TID, and retrieve the transaction information therein and identify information from within that transaction information sufficient to define and describe the purchase to the customer.

In step 540, the payment gateway sends purchase information based on the transaction information to the customer device. The purchase information may the same as, or a portion of, the transaction information (or an authorization request containing the transaction information) or it may be derived from such transaction information or authorization request as appropriate to the implementation at hand. For example, the payment gateway 130 sends, via the customer network 140, a purchase amount along with item information extracted from or determined based on the transaction information obtained in the authorization request.

Returning to FIG. 4, the customer device in step 450 receives the purchase information and, in step 460, displays the purchase information to the customer. For example, the customer mobile device 150 may display via the wallet application 155 a purchase amount along with relevant item information that identifies the item or items being purchased, allowing the customer to review the relevant information and ensure he or she wishes to complete the purchase. Additionally or alternatively, the customer mobile device may provide the purchase information to the customer by other means, such as by an automated voice communication.

In step 470, the customer device obtains from the customer an indication of assent to pay for the item or items. This is obtained, for example, by displaying a purchase amount and obtaining a selection from the customer, such as by touching a touchscreen on the customer device, of a provided "OK to Pay" button or prompt via the wallet application 155. Additionally or alternatively, the customer device may obtain the selection from the customer by other means, such as by vocal communication from the customer to the device. In such a case, where appropriate and so configured, it becomes possible for the customer to pay for a purchase without having to physically retrieve the device from his or her pocket, belt clip, purse, backpack or otherwise. The customer device may be further configured to apply security measures to the selection, such as by performing a fingerprint scan when the user makes a selection through the touchscreen or by using voice recognition of a vocal selection or command to identify the customer. In step 480, the customer device sends to the payment gateway a confirmation of the customer's assent to pay based on the indication obtained from the customer.

In another embodiment of the invention, the wallet application may be configured to automatically assume the customer's assent to pay under certain circumstances, such as when the purchase amount does not surpass a predetermined threshold and/or is associated with a merchant and/or transaction type (as determined based on the purchase information and/or the transaction identifier and/or additional information maintained by the wallet application) that has been previously designated by the customer and/or determined by the wallet application to be trustworthy and/or require no customer assent for any other reasons. When combined with alternative variations such a described above wherein the wallet application is configured so as to automatically select a payment option based on a default option previously designated by the customer or otherwise, a transaction becomes possible which essentially requires no customer interaction if desired.

Returning to FIG. 5, upon receiving the confirmation of customer assent from the customer device in step 550, the payment gateway processes the transaction in step 560. The payment gateway processes the transaction by providing at least a portion of the transaction information obtained from the merchant (or information based on such transaction information) and at least a portion of the payment information obtained from the customer (or information based on such payment information) to a payment processor corresponding to the payment account selected by the customer, and then receiving a result from the payment processor indicating whether the payment was successfully completed. It should be understood that the transaction information and payment information provided may be, as appropriate, formatted or arranged differently at different points in the transaction process, but will include or be derived from the data previously referenced by these terms.

As one example, the payment gateway 130 obtains a purchase amount from the authorization request and a payment account number from the purchase request and provides the information in appropriate form via the external network 160 to the payment processor 170 that corresponds to the owner of the payment account identified by the customer, and receives a response back from the payment processor 170 via the external network 160. If the transaction is successful (the customer payment account is valid, possesses sufficient funds, and so forth) the payment account of the customer is debited by the appropriate amount. Similarly, a financial account of the merchant is credited in the same amount by similar and/or conventional means.

The payment gateway then provides an indication of the result back to the merchant in step 570 and to the customer in step 580. Returning to FIG. 3, the merchant obtains in step 360 the transaction result via the merchant device. If the transaction result indicates the payment was successfully processed, this confirms to the merchant that the transaction has been completed and the customer can be allowed to take possession of the items. The transaction result in such case may be in the form of, or supplemented by, an electronic receipt that the merchant device can store and potentially print for the customer. If the transaction result indicates the payment was not successfully processed, this alerts the merchant that the purchase transaction is not complete, that alternative payment means may be required or may already be sought by the customer or otherwise the transaction cannot be completed.

Similarly, returning to FIG. 4, the customer obtains in step 490 the transaction result via the merchant device and, where the transaction result indicates the payment was successful, confirms that the transaction has been completed. The transaction result may be provided to the customer in similar or different form than to the merchant but is, for example, an electronic receipt that the customer device can store and the customer may revisit at a later time via the wallet application. If the transaction result indicates the payment was not successfully processed, the customer device informs the customer and may obtain alternative means of payment on the instruction of the customer. For example, the wallet application 155 may notify the customer that another form of payment is required and obtain selection of that form of payment such that the payment gateway 130 will attempt to process the purchase transaction with a different payment account, and the remaining part of the process may be repeated in similar fashion.

It should be appreciated that a purchase transaction system has been described which employs beacon technology to enable a customer mobile device to effectuate a purchase transaction without requiring the customer to present a conventional credit card or to tap or wave the customer mobile device over a reader. As a result, the customer can pay for items purchased, select payment options, receive discounts and so forth simply by approaching a point of sale and, optionally as appropriate, performing other functions to aid and improve the transaction such as by providing a payment type selection or assent to pay via the mobile device.

In the foregoing specification, it should be appreciated that the particular implementations shown and described herein are illustrative of the invention and are not intended to otherwise limit the scope of the present invention in any way. Indeed, for the sake of brevity, conventional data networking, application development and other functional aspects of the systems (and components of the individual operating components of the systems) may not be described in detail herein. It should be noted that many alternative or additional functional relationships or physical connections might be present in a practical system.

The present invention may be described herein in terms of functional block components, optional selections and/or various processing steps. It should be appreciated that, unless otherwise stated or more specifically described herein, such functional blocks may be realized by any number of hardware and/or software components suitably configured to perform the specified functions. Furthermore, any databases, systems, devices, servers or other components of the present invention may consist of any combination thereof at a single location or at multiple locations, wherein each database or system includes any of various suitable security features, such as firewalls, access codes, encryption, decryption, compression, decompression, and/or the like.

Any system components discussed herein which involve the storage, access, reference, comparison, match or retrieval of data or similar functions, unless otherwise stated or more specifically defined, may be implemented with any appropriate system, including any type of database, such as relational, hierarchical, graphical, object-oriented, and/or other database configurations. Similarly, processing steps involving the performance of such functions may likewise be performed with any such appropriate system.

Unless otherwise stated or more specifically defined, the present invention may employ any number of conventional techniques for data transmission, messaging, data processing, network control, and/or the like. One skilled in the art will appreciate that, unless otherwise stated or more specifically described herein, a network may include any system for exchanging data or transacting business, such as the Internet, an intranet, an extranet, WAN, LAN, satellite communications, cellular network, and/or the like.

It should also be appreciated that any number of available security measures may be applied as appropriate to protect information at all stages of the purchase transaction including, but not limited to encryption, password or PIN number protection, speaker recognition and any biometric applications appropriate to secure and facilitate the functions described herein such as facial recognition, fingerprint detection, retinal scanning and so on.

The invention has been described with reference to specific embodiments. However, it may be appreciated that various modifications and changes may be made without departing from the scope of the present invention. The specification and figures are to be regarded in an illustrative manner, rather than a restrictive one, and all such modifications are intended to be included within the scope of present invention. Accordingly, the scope of the invention should be determined by the appended claims and their legal equivalents, rather than by the examples given above. For example, the steps recited in any of the method or process claims may be executed in any order and are not limited to the order presented.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

What is claimed is:

1. A system for processing a purchase transaction between a merchant and a customer, the system comprising:
    means for obtaining transaction information from a merchant device, the transaction information based on item information corresponding to an item to be purchased by the customer in the purchase transaction;
    means for obtaining, from a customer mobile device, a transaction identifier sent to the customer mobile device by the merchant device and payment account information corresponding to a customer payment account;
    means for applying the transaction identifier to access the transaction information received from the merchant device and generating purchase information based on the transaction information accessed;
    means for sending, to the customer mobile device, the purchase information for display to the customer to obtain an indication of assent to pay for the item;
    means for obtaining, from the customer mobile device, a confirmation of customer assent based on the indication obtained from the customer; and
    means for processing, upon receiving the confirmation of customer assent from the customer mobile device, the purchase transaction based on the payment account information.

2. The system of claim 1 wherein the transaction identifier comprises a merchant identification number.

3. The system of claim 1 wherein the transaction identifier comprises a terminal identification number.

4. The system of claim 1 wherein the transaction identifier comprises a device identification number.

5. The system of claim 1, further comprising:
    means for obtaining a beacon payment indicator from the merchant device; and
    means for invoking the means for obtaining the transaction identifier from the customer device upon the beacon payment indicator indicating that the purchase transaction is a beacon-based transaction.

6. The system of claim 1, further comprising means for providing a transaction result to the merchant device upon processing the purchase transaction.

7. The system of claim 1, further comprising means for providing a transaction result to the mobile customer device upon processing the purchase transaction.

8. The system of claim 1, further comprising:
    means for obtaining a customer identifier from the customer mobile device; and
    means for applying the customer identifier to access additional payment account information.

9. The system of claim 1, further comprising:
    means for obtaining a customer identifier from the customer mobile device;
    means for applying the customer identifier to determine whether the customer is entitled to a discount; and
    means for applying the discount to the purchase transaction if the customer is determined to be entitled to the discount.

10. The system of claim 1, further comprising means for selecting a payment processor based on the payment account information obtained from the customer mobile device.

11. A method of processing a purchase transaction between a merchant and a customer, the method comprising:

obtaining transaction information from a merchant device, the transaction information based on item information corresponding to an item to be purchased by the customer in the purchase transaction;

obtaining, from a customer mobile device, a transaction identifier sent to the customer mobile device by the merchant device and payment account information corresponding to a customer payment account;

applying the transaction identifier to access the transaction information received from the merchant device and generating purchase information based on the transaction information accessed;

sending, to the customer mobile device, the purchase information for display to the customer to obtain an indication of assent to pay for the item;

obtaining, from the customer mobile device, a confirmation of customer assent based on the indication obtained from the customer; and processing, upon receiving the confirmation of customer assent from the customer mobile device, the purchase transaction based on the payment account information.

12. The method of claim 11 wherein the transaction identifier comprises a merchant identification number.

13. The method of claim 11 wherein the transaction identifier comprises a terminal identification number.

14. The method of claim 11 wherein the transaction identifier comprises a device identification number.

15. The method of claim 11, further comprising obtaining a beacon payment indicator from the merchant device, wherein obtaining the transaction identifier from the customer device is performed upon the beacon payment indicator indicating that the purchase transaction is a beacon-based transaction.

16. The method of claim 11, further comprising providing a transaction result to the merchant device upon processing the purchase transaction.

17. The method of claim 11, further comprising providing a transaction result to the mobile customer device upon processing the purchase transaction.

18. The method of claim 11, further comprising:
obtaining a customer identifier from the customer mobile device; and
applying the customer identifier to access additional payment account information.

19. The method of claim 11, further comprising:
obtaining a customer identifier from the customer mobile device;
applying the customer identifier to determine whether the customer is entitled to a discount; and
applying the discount to the purchase transaction if the customer is determined to be entitled to the discount.

20. The method of claim 11, further comprising selecting a payment processor based on the payment account information obtained from the customer mobile device.

* * * * *